(12) United States Patent
Bauer

(10) Patent No.: US 12,142,122 B2
(45) Date of Patent: Nov. 12, 2024

(54) CIVIL ENGINEERING DEVICE AND SYSTEM FOR MONITORING A CONSTRUCTION SITE

(71) Applicant: BAUER Spezialtiefbau GmbH, Schrobenhausen (DE)

(72) Inventor: Florian Bauer, Schrobenhausen (DE)

(73) Assignee: BAUER Spezialtiefbau GmbH, Schrobenhausen (DE)

( * ) Notice: Subject to any disclaimer, the term of this patent is extended or adjusted under 35 U.S.C. 154(b) by 807 days.

(21) Appl. No.: 17/046,589

(22) PCT Filed: Apr. 2, 2019

(86) PCT No.: PCT/EP2019/058290
§ 371 (c)(1),
(2) Date: Oct. 9, 2020

(87) PCT Pub. No.: WO2019/197219
PCT Pub. Date: Oct. 17, 2019

(65) Prior Publication Data
US 2021/0110684 A1   Apr. 15, 2021

(30) Foreign Application Priority Data

Apr. 11, 2018 (EP) .................................. 18166806

(51) Int. Cl.
| | | |
|---|---|---|
| *G08B 13/196* | (2006.01) | |
| *E21B 7/02* | (2006.01) | |
| *E21B 41/00* | (2006.01) | |
| *H04N 5/265* | (2006.01) | |

(Continued)

(52) U.S. Cl.
CPC ............ *G08B 13/1961* (2013.01); *E21B 7/02* (2013.01); *E21B 41/0021* (2013.01); *H04N 5/265* (2013.01); *H04N 7/188* (2013.01); *H04N 23/54* (2023.01)

(58) Field of Classification Search
CPC ........ E21B 7/02; G08B 13/1961; H04N 7/188
See application file for complete search history.

(56) References Cited

U.S. PATENT DOCUMENTS

2016/0201394 A1* 7/2016 Spreitzer ................ E21B 43/10
175/57
2017/0167853 A1* 6/2017 Zheng .................... E21B 19/06

FOREIGN PATENT DOCUMENTS

| CN | 205242405 U | 5/2016 |
| EP | 1 482 238 A2 | 12/2004 |
| EP | 1 482 238 A3 | 8/2005 |

(Continued)

OTHER PUBLICATIONS

Office Action issued in EP 18 166 806.2; mailed by the European Patent Office on Mar. 4, 2022.

(Continued)

*Primary Examiner* — Kristyn A Hall
(74) *Attorney, Agent, or Firm* — Studebaker & Brackett PC

(57) ABSTRACT

The invention relates to a civil engineering device with an undercarriage with a crawler chassis, an upper carriage, which is arranged on the undercarriage, and a mast, which is mounted vertically oriented on the upper carriage. According to the invention it is provided that arranged on an upper area of the mast is at least one camera, by which an image of the civil engineering device and its surroundings can be recorded.

16 Claims, 2 Drawing Sheets

Figure 1:
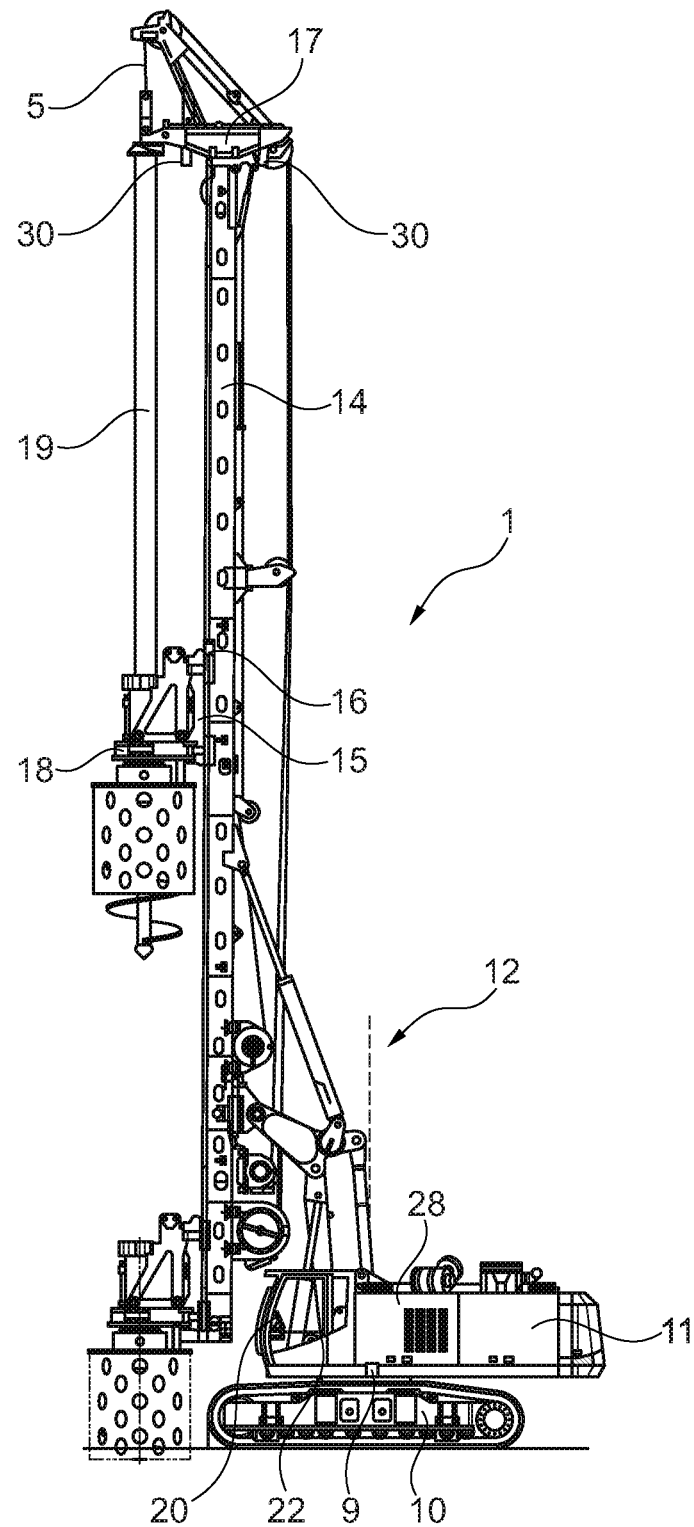

(51) Int. Cl.
*H04N 7/18* (2006.01)
*H04N 23/54* (2023.01)

(56) References Cited

FOREIGN PATENT DOCUMENTS

| EP | 2378054 A1 | 10/2011 |
|----|------------|---------|
| JP | 2010241548 A | 10/2010 |
| WO | 2018/078054 A1 | 5/2018 |

OTHER PUBLICATIONS

International Preliminary Report On Patentability issued in PCT/EP2019/058290; Date of completion of this report: Mar. 23, 2020.
An Office Action mailed by China National Intellectual Property Administration on Aug. 22, 2022, which corresponds to Chinese Patent Application No. 201980024526.4 and is related to U.S. Appl. No. 17/046,589; with English language translation.
International Search Report issued in PCT/EP2019/058290; mailed Jul. 10, 2019.
An Office Action mailed by the Intellectual Property Corporation of Malaysia on Feb. 22, 2024, which corresponds to Malaysian Patent Application PI2020004626 and is related to U.S. Appl. No. 17/046,589.

\* cited by examiner

CIVIL ENGINEERING DEVICE AND SYSTEM FOR MONITORING A CONSTRUCTION SITE

The invention relates to a civil engineering device with an undercarriage with a crawler chassis, an upper carriage, which is arranged on the undercarriage, and a mast, which is oriented vertically and mounted on the upper carriage, according to the preamble of claim 1.

Such a civil engineering device, which is designed as a drill rig, is shown in EP 2 378 054 A1, for example. In particular, a safety device for a construction machine is known from this printed publication, with which device account is taken of increasing demands on operational and occupational safety. For it, this construction machine is equipped with a plurality of sensors that detect the respective operating state in order to avoid critical operating situations.

The object of the invention is to specify a civil engineering device with which an improved security can be achieved.

This object is achieved according to the invention by a civil engineering device with the features of claim 1. Preferred embodiments are indicated in the dependent claims.

The civil engineering device according to the invention is characterised in that arranged on an upper area of the mast is at least one camera, by means of which an image of the civil engineering device and its surroundings can be recorded.

A basic idea of the invention can be seen in the arrangement of at least one camera on the mast of the civil engineering device for surveillance purposes. Cameras, in particular electronic cameras, are generally known for surveillance purposes. One aspect of the invention, however, consists in arranging the camera in the special construction of a civil engineering device not simply on the upper carriage, but above the upper carriage on an upper area of the mast of the civil engineering device. In particular, the camera can be arranged on the transversely directed mast head on the top side or preferably on the bottom side of the mast head in a protected manner. Due to this positioning, not only can a good overview of the civil engineering device and the surroundings be achieved, but a camera arranged on the upper area of the mast is also particularly protected against the harsh construction site conditions.

Here the image can be transmitted in a simple variant to a control station or a control centre, wherein a surveillance takes place by a person or by a computer system.

A preferred embodiment of the invention consists in arranging several cameras, which are oriented in different directions. At the upper, normally T-shaped mast end with a transversely directed mast head, a first camera is preferably arranged on a front side of the mast head and a second camera on the rear side of the mast head. Two cameras can also be arranged on the front side and rear side respectively, wherein the two pairs of cameras are then each oriented to opposing sides, so that as extensive an image as possible of the surroundings, including a top view onto the civil engineering device, is achieved.

Another improvement can be achieved according to an implementation variant of the invention in that at least one camera is supported and driven pivotably. A larger observation area can thus be covered by one camera. In particular, the camera can also be adjusted and focused by a rear control unit, so that even zoom settings of details of the civil engineering device or the surroundings are possible.

It is particularly expedient here that a 360° image of the surroundings can be produced by the at least one camera. When using several cameras, these are linked via the control unit to a corresponding software such that a 360° image of the surroundings is composed from several camera adjustments. A virtually complete top view onto the civil engineering device and a predetermined surrounding area around the civil engineering device can thus be achieved from above.

It is preferably provided that the at least one camera is connected to at least one control unit. The connection can be wired or preferably wireless.

According to a further development of the invention, it is particularly advantageous that the control unit is arranged in a control station of the civil engineering device and/or remote from the civil engineering device. The control unit can thus be arranged both in the control station and in a control centre, for example in the site management of the construction site or in a control centre of the construction company. Surveillance of the civil engineering device can thus be undertaken both during standstill and during operation, not only by the machine operator but also by a decentralised monitoring station. Thus the machine operator can be additionally supported by a remote control centre in security matters. The security here can relate to both the actual operation of the civil engineering device and to shutdown times in which the civil engineering device is thus protected against theft and vandalism, for instance at night time.

A particularly expedient implementation variant consists in the control unit being able to emit a warning signal when a person or object approaches relative to the civil engineering device and enters a security area. In particular, a security area with a predeterminable security distance, which can be about 1 to 2 m, can be stored virtually in this case in an electronic control unit. The image produced by the at least one camera can be monitored via a suitable image processing software, so that the control unit recognises automatically when a possible collision hazard arises during the operation of the civil engineering device or when a person approaches the civil engineering device during standstill or in other operation of the civil engineering device.

The warning signal can be displayed in a suitable manner directly on the civil engineering device as a warning tone, for example, or as a warning light. At the same time, an operating interruption of the civil engineering device can be caused by the warning signal, in particular when a person is located in an inner hazard area at the civil engineering device, which area can be a part of the defined warning area.

According to the invention, the civil engineering device can be in particular a drill rig, in particular a pile boring rig, a diaphragm wall machine, in particular a diaphragm wall cutter or a diaphragm wall grab, a vibrator and/or a ram.

According to another aspect of the invention, this relates to a system for monitoring a construction site, wherein several civil engineering devices according to the invention such as described previously are provided and the civil engineering devices are connected to a common control unit, by which the images from an individual civil engineering device are put together to an overall image of the construction site. According to this system, the surveillance units of several civil engineering devices can thus be networked with one another and interconnected, so that an overall view of a construction site can be attained. A particularly good surveillance and thus security of the individual civil engineering devices and the construction site as a whole can be achieved hereby.

The control unit can also be provided with a corresponding storage device with which the images of individual civil engineering devices or of all civil engineering devices are stored. Both the occupational safety and security against theft and vandalism on a construction site can be increased hereby.

In particular, the system according to the invention is developed further in that a warning signal is emitted by the control unit when a person enters the security area of the construction site. A security area is defined by the control unit by a corresponding image processing software and a security distance predetermined by operating personnel. On an ingress of persons into this security area, a corresponding warning signal and if applicable an operating stop of individual or all civil engineering devices and of further construction machines possible present on the construction site can be triggered.

The security or warning area can be divided into two, wherein in an outer area only a warning signal is initially given, while in a defined inner area the operating stop then takes place.

The invention is explained below on the basis of a preferred exemplary embodiment, which is depicted schematically in the drawings. In the drawings there are shown:

FIG. 1 a side view of a civil engineering device according to the invention and

Figure 2:
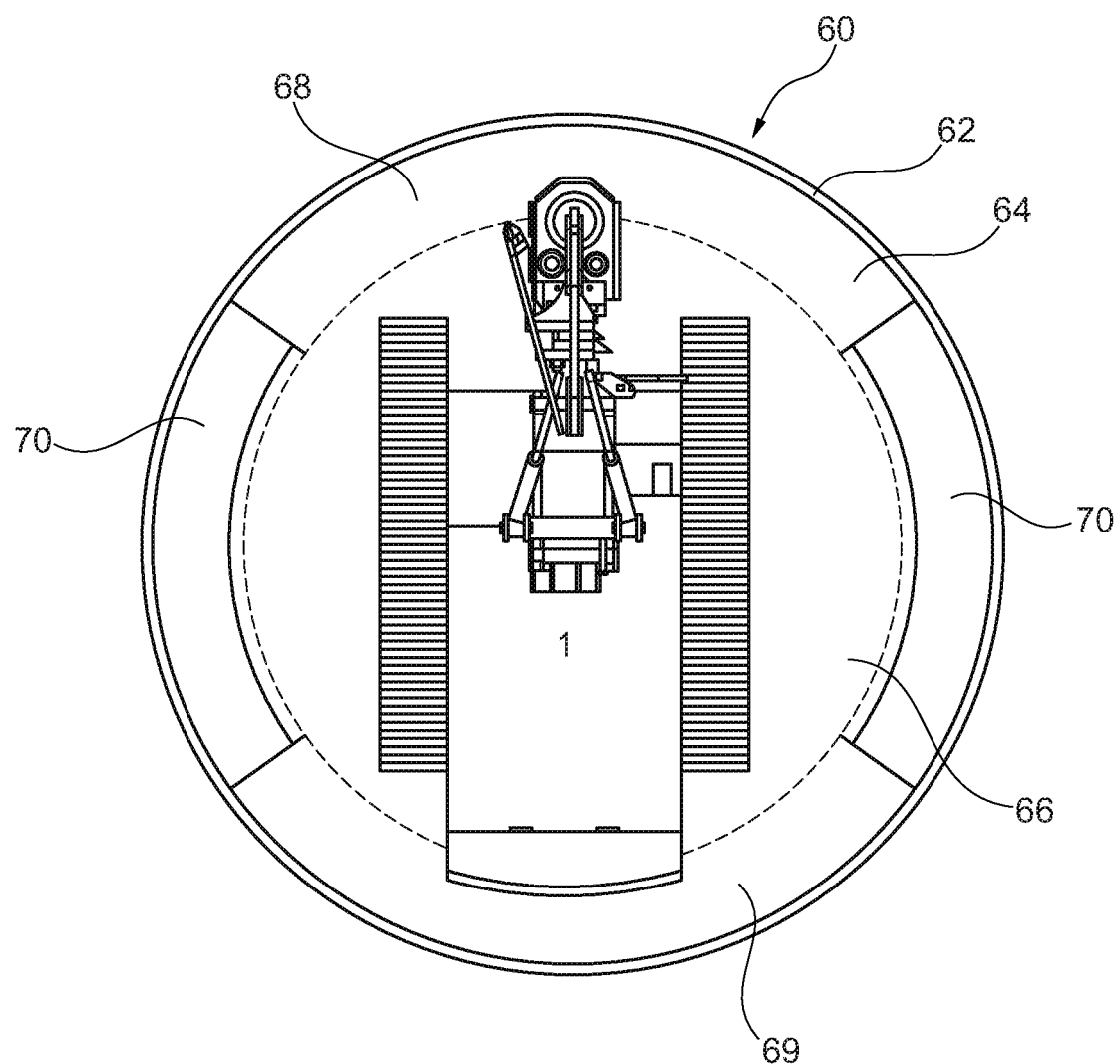

FIG. 2 a picture of a signalling on the civil engineering device of FIG. 1.

According to FIG. 1, a civil engineering device 1 according to the invention is designed as a drill rig. The civil engineering device 1 has a carrier apparatus 9 with an undercarriage 10, on which an upper carriage 11 with a control station 22 and a drive unit 28 are supported rotatably.

A vertical mast 14 is supported pivotably on the upper carriage 11 via a mast linkage 12. Arranged on a front side of the mast 14 is a mast guide 16, along which a mast carriage 15 with a drill drive 18 is supported displaceably. The drill drive 18 drives a drilling tool 13 in a rotary manner, which tool 13 is mounted in a generally known manner on a kelly bar 19, which is in turn supported vertically adjustably via a main cable 5 over a mast head 17.

According to the invention, a transversely directed mast head 17 is mounted on the upper end of the mast 14, on the underside of which two cameras 30 of a surveillance system according to the invention are arranged. The cameras 30 are directed downwards to produce an image 60 of the civil engineering device 1 from above, which is shown by example in FIG. 2.

Here, the images from the cameras 30, which are arranged on the transversely directed mast head 17 on a front and rear side with respect to the mast 14, are transmitted to a control unit 20 in the control station 22 of the carrier apparatus 9. Here, the control unit 20 can have a monitor on which the image schematically depicted in FIG. 2 is composed from the images of the cameras 30 by means of image processing software and is displayed.

In the image 60 thus produced, the civil engineering device 1 and surroundings are shown with a predefined, circular security area 2 in the exemplary embodiment depicted. The security area can be projected by the software of the control unit into the image to create a better overview for an operator. If a person or object approaches relative to the civil engineering device 1 and enters the security area 62, a warning signal can be emitted acoustically, optically or in another way via the control unit 20.

The security area 62 is preferably divided into an outer annular warning area 64 and an inner circular warning area 66. The individual warning areas 64, 66 can themselves be divided into further sectors, thus into a front sector 68, a rear sector 69 and two lateral sectors 70 in the exemplary embodiment depicted. In the event of an ingress into these different warning areas 64, 66 or sectors, different measures can be taken by the control unit. Thus upon an ingress only into the annular outer warning area 64, a warning signal can be emitted. In the event of a further advance relative to the civil engineering device 1 into the inner warning area 66, which can represent a direct hazard zone in operation of the civil engineering device, an operating stop can be initiated by the control unit, for example.

An increased occupational safety and improved surveillance of the civil engineering device 1 can thus be achieved by the system according to the invention. In particular, the cameras 30 can be operating even when the civil engineering device 1 is at a standstill, in order to detect an unauthorised access to the civil engineering device 1, for instance, and to communicate this to a control unit 20, which can also be arranged remotely from the civil engineering device 1. Suitable countermeasures can then be initiated from a suitably remote control centre with the control unit 20, such as the emission of a warning signal, switching the lighting on and/or delivering information to a security or guard staff.

The invention claimed is:

1. A civil engineering device with
an undercarriage with crawler chassis,
an upper carriage, which is separately arranged on the undercarriage and supported rotatably, and
a mast, which is oriented vertically and mounted on the upper carriage, the mast having a first side on a same side as the upper carriage and having a second side on an opposite side of the first side,
wherein arranged on an upper area of the mast on the first side is a first camera, and on the second side is a second camera, by which an image of the civil engineering device and its surroundings can be recorded, and a circular security area is defined in the image that surrounds the civil engineering device,
wherein at least one camera of the first camera and the second camera is connected to at least one control unit and
a warning signal can be emitted by the control unit when a person or an object approaches relative to the civil engineering device and enters the circular security area.

2. The civil engineering device according to claim 1, wherein
the first camera and the second camera are oriented in different directions.

3. The civil engineering device according to claim 1, wherein
at least one of the first camera and the second camera is supported and driven pivotably.

4. The civil engineering device according to claim 1, wherein
the first camera and the second camera produce a 360° image of the surroundings.

5. The civil engineering device according to claim 1, wherein
the control unit is arranged in a control station of the civil engineering device and/or remote from the civil engineering device.

6. The civil engineering device according to claim 1, wherein
the civil engineering device is a drill rig, a diaphragm wall machine, a vibrator and/or a ram.

7. The civil engineering device according to claim 1, including a Kelly bar, and one camera of the first camera and the second camera is positioned in a space between the Kelly bar and the mast.

8. The civil engineering device according to claim 1, including a drilling tool having an axis of rotation, and one camera of the first camera and the second camera is positioned in a space between the drilling tool axis of rotation and the mast.

9. The civil engineering device according to claim 1, including a mast head positioned on an upper end of the mast, the mast head having an underside, and at least one camera of the first camera and the second camera is positioned on the underside of the mast head such that the at least one camera extends toward the underside of the mast head, and the at least one camera is oriented in a direction in which the mast extends.

10. The civil engineering device according to claim 1, including a mast linkage positioned between the mast and the upper carriage, and one camera of the first camera and the second camera is positioned directly above the mast linkage.

11. The civil engineering device according to claim 1, including a drilling tool, and one camera of the first camera and the second camera is positioned directly above the drilling tool.

12. The civil engineering device according to claim 1, including a drill drive connected to the mast, and one camera of the first camera and the second camera is positioned between the drill drive and the mast.

13. The civil engineering device according to claim 1, including a main cable that supports a Kelly bar, and one camera of the first camera and the second camera is positioned in a space between a part of the main cable and the mast.

14. The civil engineering device according to claim 1, including
- a mast head positioned on an upper end of the mast, and
- a main cable extending in a first direction away from the mast head,
- the first camera is positioned on an opposite side of the mast head from where the main cable extends in the first direction away from the mast head, and
- the second camera is positioned in a space between the mast head and the main cable.

15. A system for monitoring a construction site,
wherein
several civil engineering devices according to claim 11 are provided and the civil engineering devices are connected to a common control unit, by which the images from an individual civil engineering device are put together into an overall image of the construction site.

16. The system according to claim 15,
wherein
a warning signal is emitted by the control unit when a person enters a security area of the construction site.

* * * * *